(12) United States Patent
Abe et al.

(10) Patent No.: US 8,647,546 B2
(45) Date of Patent: Feb. 11, 2014

(54) METHOD FOR MANUFACTURING FRICTION MATERIAL, FRICTION MATERIAL AND BRAKING DEVICE (75) Inventors: Kenji Abe, Toyota (JP); Hiroshi Isono, Mishima (JP); Yoshitomo Denou, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 59 days.

(21) Appl. No.: 13/142,470

(22) PCT Filed: Jun. 15, 2009

(86) PCT No.: PCT/JP2009/060864
§ 371 (c)(1), (2), (4) Date: Jun. 28, 2011

(87) PCT Pub. No.: WO2010/146664
PCT Pub. Date: Dec. 23, 2010

(65) Prior Publication Data
US 2011/0275547 A1    Nov. 10, 2011

(51) Int. Cl.
*B29C 70/64* (2006.01)
*B29C 39/02* (2006.01)

(52) U.S. Cl.
USPC ............................ 264/108; 508/100

(58) Field of Classification Search
CPC ........ B29C 70/62; B29C 39/02; B29C 70/64; B29C 39/08
USPC .......................................... 508/100; 264/108
See application file for complete search history.

(56) References Cited

U.S. PATENT DOCUMENTS 5,288,353 A * 2/1994 Revankar ............... 156/153
2006/0086575 A1   4/2006 Niehorster

FOREIGN PATENT DOCUMENTS

| CN | 1766361 A | 5/2006 |
| JP | 64-079432 A | 3/1989 |
| JP | 7-243460 A | 9/1995 |
| JP | 8-233003 A | 9/1996 |
| JP | 08-270695 A | 10/1996 |
| JP | 2002-257168 A | 9/2002 |
| JP | 2004-316854 A | 11/2004 |

OTHER PUBLICATIONS

International Preliminary Report on Patentability issued in corresponding PCT/JP2009/060864, dated Feb. 2, 2012.
International Search Report for PCT/JP2009/060864, dated Aug. 4, 2009.

* cited by examiner

Primary Examiner — Yogendra Gupta
Assistant Examiner — Alison Hindenlang
(74) Attorney, Agent, or Firm — Sughrue Mion, PLLC (57) ABSTRACT

A plurality of hard particles 102 is arranged in a mold 302 which suppresses movement of the hard particles 102 so as to be close to each other, and the hard particles 102 arranged in the mold 302 are fixed with resin 103, thereby forming a friction surface 101. Therefore, a pad 100a in which the plurality of hard particles 102 is arranged on the friction surface 101 can be more easily manufactured.

7 Claims, 7 Drawing Sheets

METHOD FOR MANUFACTURING FRICTION MATERIAL, FRICTION MATERIAL AND BRAKING DEVICE

CROSS REFERENCE TO RELATED APPLICATION

This application is a National Stage of International Application No. PCT/JP2009/060864 filed Jun. 15, 2009, the contents of all of which are incorporated herein by reference in their entirety.

TECHNICAL FIELD

The present invention relates to a method for manufacturing a friction material, a friction material, and a braking device, and particularly, to a method for manufacturing a friction material having a friction surface, a friction material having a friction surface, and a braking device having a pair of friction materials having friction surfaces.

BACKGROUND ART

A braking device consisting of a pad and a rotor (disc) of a conventional brake for an automobile is a combination of a relatively hard component and a relatively soft component. Therefore, the conventional braking device has a problem in that the effect of the brake is poor or either of the hard and soft components is apt to wear out. For example, in a braking device in which a non-steel pad consisting of a soft resin-based component, and a harder cast-iron rotor are combined together, and a frictional force is generated by adhesion friction, there is a problem in that the effect of the brake is poor. Additionally, in a braking device in which a low steel pad consisting of hard steel fibers, and a softer cast-iron rotor are combined together, and a frictional force is generated by abrasive friction, there is a problem in that there is a lot of wear on the rotor.

Thus, for example, Patent Literature 1 discloses a brake pad, which is manufactured by arranging and forming a composite material portion consisting of at least silicon carbide and metal silicon in a predetermined ratio and having excellent wear resistance, on the surface of a base material of a C/C composite which is a composite carbon fiber, a brake disc, and a brake consisting of the brake pad, in order to improve wear resistance.

CITATION LIST

Patent Literature

[Patent Literature 1] Japanese Unexamined Patent Application Publication No. 2002-257168

SUMMARY OF INVENTION

Technical Problem

In the braking device in which hard materials are arranged on both the pad and the disc as described above, there is an advantage that wear is very slight on both the pad and the disc. Therefore, a method for manufacturing the above friction material more easily is desired.

The invention has been made in consideration of such circumstances, and the object thereof is to provide a method for manufacturing a friction material which allows easier manufacture of a friction material in which hard members are arranged on a friction surface. Additionally, another object of the invention is to provide a friction material and a braking device in which hard members are arranged on a friction surface and which can be more easily manufactured.

Solution to Problem

The invention is a method for manufacturing a friction material having a plurality of hard members arranged on a friction surface thereof. The method includes arranging the plurality of hard members within a frame which suppresses movement of the hard members so as to come into contact with each other; and fixing the hard members arranged within the frame with a connection material, thereby forming the friction surface.

According to this configuration, the plurality of hard members is arranged within a frame which suppresses movement of the hard members so as to come into contact with each other; and the hard members arranged within the frame are fixed with a connection material, thereby forming the friction surface. Therefore, a friction material in which the plurality of hard members is arranged on the friction surface can be more easily manufactured.

In this case, preferably, in the arranging of the plurality of hard members within the frame so as to come into contact with each other, the spherical hard members of the same size are arranged so as to be arranged in the shape of a hexagonal lattice of at least two layers.

According to this configuration, in the arranging of the plurality of hard members in the frame so as to come into contact with each other, the spherical hard members of the same size are arranged so as to be arranged in the shape of a hexagonal lattice of at least two layers. Therefore, it is easy to arrange the hard members in a plurality of layers at the highest density. Therefore, the friction material which generates a large frictional force can be easily manufactured.

Additionally, in the arranging of the plurality of hard members within the frame so as to come into contact with each other, the spherical hard members of the same size having a predetermined thickness of thin films provided on the surfaces thereof can be arranged so as to come into contact with each other.

According to this configuration, in the arranging of the plurality of hard members within the frame so as to come into contact with each other, the spherical hard members of the same size having a predetermined thickness of thin films provided on the surfaces thereof can be arranged so as to come into contact with each other. Therefore, it becomes easy to arrange the hard members at intervals of twice the thickness of the thin films. Therefore, the friction material having the friction surface in which the hard members are arranged at predetermined intervals can be more easily manufactured.

Additionally, it is preferable that, in the arranging of the plurality of hard members within the frame so as to come into contact with each other, a fluid and the hard members are put into the frame while being mixed together, and then, the fluid is pressurized to discharge at least a portion of the fluid from the inside of the frame, thereby arranging the plurality of hard members within the frame so as to come into contact with each other.

According to this configuration, in the arranging of the plurality of hard members within the frame so as to come into contact with each other, a fluid and the hard members are put into the frame while being mixed together, and then, the fluid is pressurized to discharge at least a portion of the fluid from the inside of the frame. Therefore, it becomes easy to arrange the plurality of hard members using the lubrication action of the fluid so as to come into contact with each other.

In this case, preferably, the fluid is the connection material.

In this configuration, since the fluid for increasing the lubricity of the hard members can also be used as the connection material, the process is simplified, and the manufacture of the friction material becomes easier.

Additionally, the invention is a method for manufacturing a friction material having a plurality of hard members arranged on a friction surface thereof. The method includes dispersing and arranging the plurality of hard members within a frame while reducing the travel distance caused by the influence of gravity; and fixing the hard members arranged within the frame with a connection material, thereby forming the friction surface.

According to this configuration, the plurality of hard members is dispersed and arranged within a frame while reducing the travel distance caused by the influence of gravity, and the hard members arranged within the frame are fixed with a connection material, thereby forming the friction surface. Therefore, the friction material having the friction surface in which the hard members are irregularly dispersed and arranged at a desired density can be more easily manufactured.

In this case, preferably, in the dispersing and arranging of the plurality of hard members within the frame while reducing the travel distance caused by the influence of gravity, the hard members are dispersed and arranged within the frame by rotating the frame into which the hard members are put.

According to this configuration, in the dispersing and arranging of the plurality of hard members within the frame while reducing the travel distance caused by the influence of gravity, the hard members are dispersed and arranged within the frame by rotating the frame into which the hard members are put. Therefore, it is possible to easily implement reduction of the travel distance caused by the influence of gravity and dispersing the hard members.

Additionally, the friction material manufactured by the manufacturing method of the invention has hard members arranged on a friction surface, and can be more easily manufactured.

Additionally, the invention is a braking device which includes a first friction material and a second friction material which are manufactured by the manufacturing method of the invention, and in which the friction surface of the second friction material moves with respect to the friction surface of the first friction material. This braking device has hard members arranged on a friction surface, and can be more easily manufactured.

In this case, as the second friction material rotates, the friction surface of the second friction material can be made to move with respect to the friction surface of the first friction material.

According to this configuration, the braking device of the invention can be applied to an automobile, for example, using the first friction material as a brake pad and using the second friction material as a brake disc or a brake drum.

Additionally, the invention is a friction material embedded such that a plurality of spherical hard members is partially exposed to a friction surface.

According to this configuration, a friction material is embedded such that a plurality of spherical hard members is partially exposed to a friction surface. Therefore, arrangement of the hard members is easy, and the friction material can be more easily manufactured.

In this case, preferably, the hard members are arranged on the friction surface so as to come into contact with each other through a hexagonal lattice-like arrangement.

According to this configuration, the hard members are arranged on the friction surface so as to come into contact with each other through a hexagonal lattice-like arrangement. Therefore, it is easy to arrange hard members at the highest density. Therefore, a friction material which can be easily manufactured and which generates a large frictional force can be obtained.

Additionally, the invention is a braking device including a first friction material embedded such that a plurality of spherical hard members is partially exposed to a friction surface and a second friction material embedded such that a plurality of spherical hard members is partially exposed to a friction surface. The friction surface of the second friction material moves with respect to the friction surface of the first friction material.

According to this configuration, the braking device includes a first friction material embedded such that a plurality of spherical hard members is partially exposed to a friction surface and a second friction material embedded such that a plurality of spherical hard members is partially exposed to a friction surface. The friction surface of the second friction material moves with respect to the friction surface of the first friction material. Therefore, a braking device which can be easily manufactured and which generates a large frictional force can be obtained.

In this case, preferably, the hard members are arranged on the friction surface so as to come into contact with each other through a hexagonal lattice-like arrangement.

According to this configuration, the hard members are arranged on the friction surface so as to come into contact with each other through a hexagonal lattice-like arrangement. Therefore, it is easy to arrange hard members at the highest density. Therefore, a friction material which can be easily manufactured and which generates a large frictional force can be obtained.

Additionally, as the second friction material rotates, the friction surface of the second friction material can be made to move with respect to the friction surface of the first friction material.

According to this configuration, the braking device of the invention can be applied to an automobile, for example, using the first friction material as a brake pad and using the second friction material as a brake disc or a brake drum.

Advantageous Effects of Invention

According to the method for manufacturing a friction material of the invention, it is possible to more easily manufacture a friction material in which hard members are arranged on a friction surface. Additionally, the friction material and braking device of the invention have hard members arranged on a friction surface, and can be more easily manufactured.

DESCRIPTION OF EMBODIMENTS

Hereinafter, a braking device related to embodiments of the invention will be described with reference to the drawings.

Figure 1:
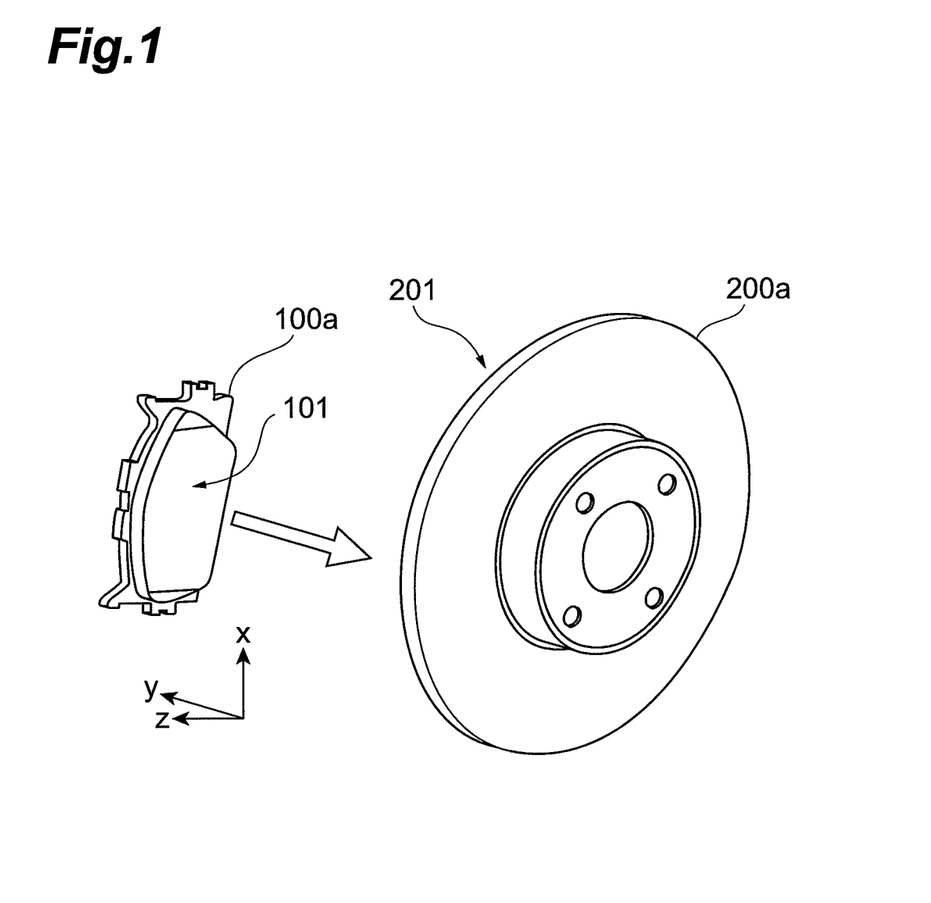
FIG. 1 is a perspective view showing a pad and a disc related to a first embodiment.

In a first embodiment of the invention, the braking device related to the invention is applied to a disc brake of an automobile. As shown in FIG. 1, the disc brake generates a frictional force as a pad 100a is pressed against a disc 200a which rotates.

Figure 2:
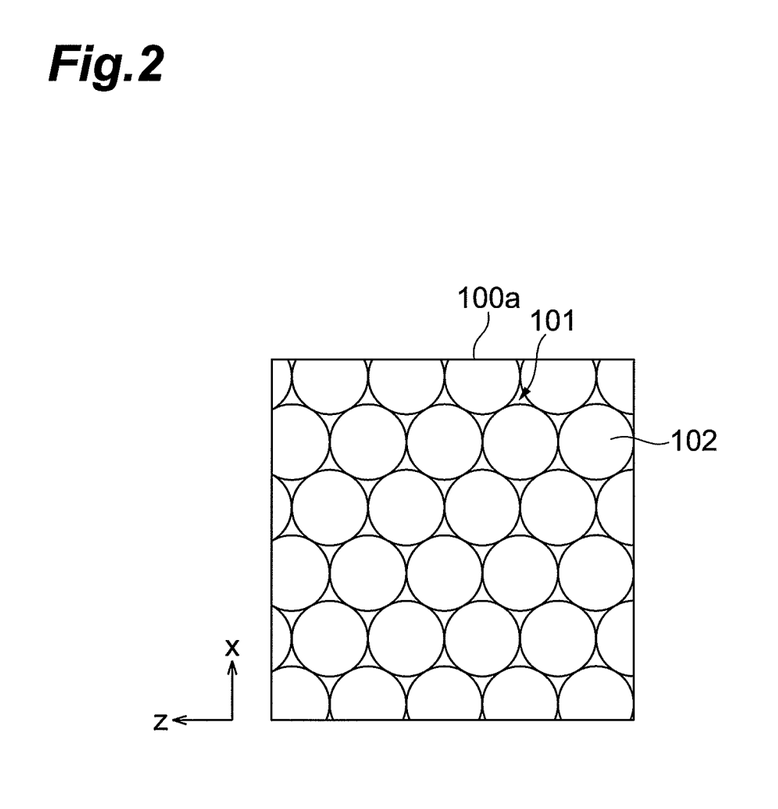
FIG. 2 is a plan view showing a friction surface of the pad related to the first embodiment.

As shown in FIG. 2 which is a plan view of the pad 100a seen from a y-direction of FIG. 1, a plurality of spherical hard particles 102 of the same size is arranged in the shape of a hexagonal lattice on the friction surface 101 of the pad 100a. The hard particles are resiliently supported on the friction surface 101 by resin or the like. At least portions of the hard particles 102 are exposed from the friction surface 101.

The diameter of the hard particles 102 is 5 to 20 μm, and more preferably 8 to 15 μm. The hard particles 102 are made of ceramics, such as $Si_3N_4$, $Al_2O_3$, and $ZrO_2$. Additionally, even in the disc 200a, the same hard particles 102 are arranged on a friction surface 201.

Figure 3:
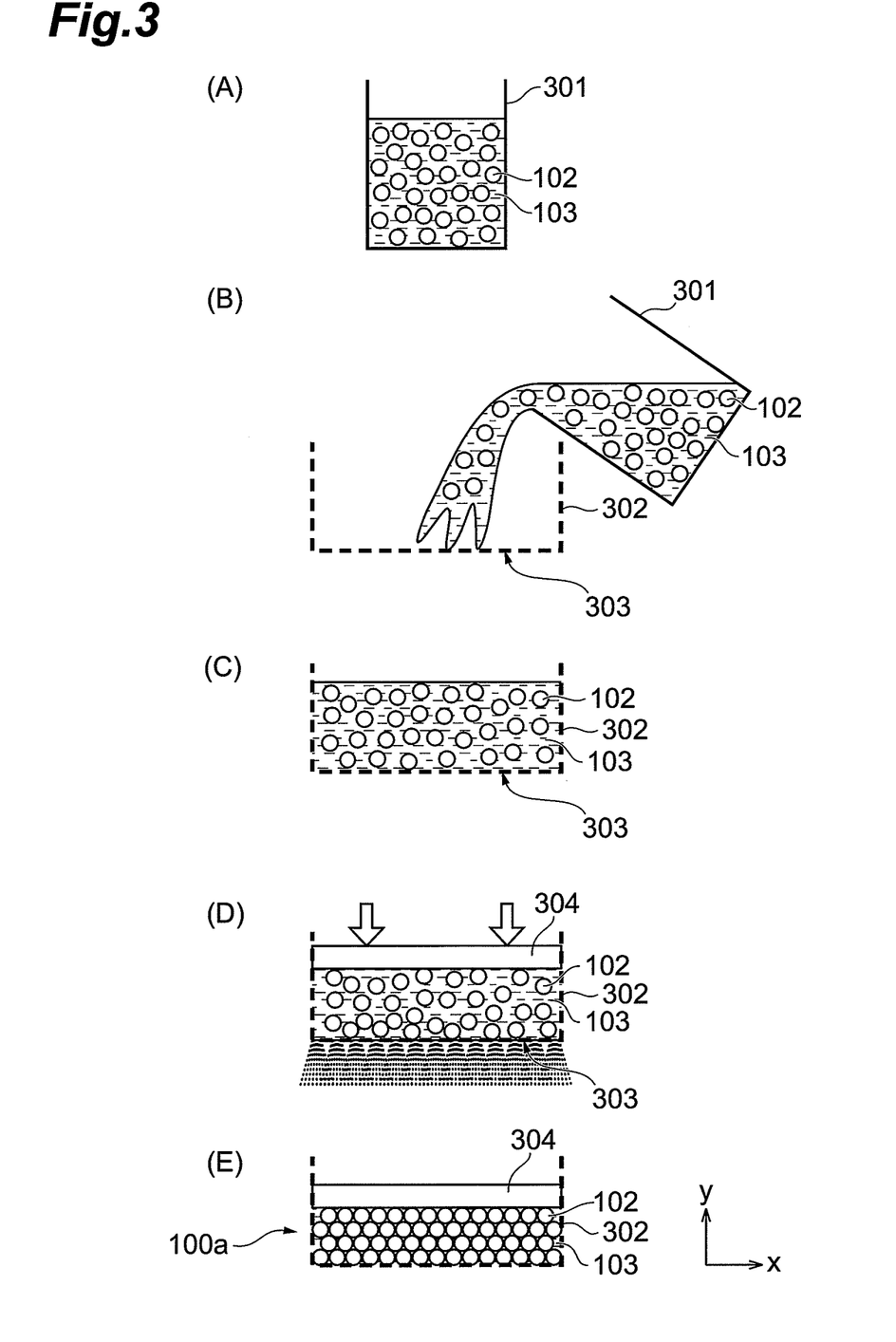
FIGS. 3A to 3E are views showing a manufacturing process of the pad related to a first embodiment.

Hereinafter, a method for manufacturing the pad 100a of the present embodiment will be described. As shown in FIG. 3A, resin (an admixture containing a resin-based organic ingredient of 50% or more, such as rubber or resin) 103 which is liquefied at high temperature and the hard particles 102 are mixed together in a container 301.

As shown in FIGS. 3B and 3C, the mixture of the hard particles 102 and the resin 103 is made to flow into a mold 302 which has a hole portion 303 provided with a plurality of holes whose diameter is smaller than the diameter of the hard particles 102. The base area and volume of the mold 302 are set according to the number and amount of the hard particles 102 such that two or more layers of the hard particles 102 are stacked in the mold 302.

As shown in FIG. 3D, while resin 103 is controlled to a temperature with a certain degree of viscosity, high pressure is applied to the mixture of the hard particles 102 and the resin 103 by a pressurizing cylinder 304. As a result, extra resin 103 is discharged from the hole portion 303.

As shown in FIG. 3E, finally, the hard particles 102 are aligned in the shape of a hexagonal lattice in which the density of the hard particles becomes the highest, and the resin 103 remains between the hard particles 102. After the resin 103 is cooled, heat treatment or the like is performed, and the resin 103 is completely cured.

In the present embodiment, a plurality of hard particles 102 is arranged in the mold 302 which suppresses movement of the hard particles 102 so as to be close to each other, and the hard particles 102 arranged in the mold 302 are fixed with the resin 103 to form the friction surface 101. Therefore, the pad 100a in which a plurality of hard particles 102 is arranged on the friction surface 101 can be more easily manufactured.

Additionally, according to the present embodiment, in the process of arranging the plurality of hard particles 102 in the mold 302 so as to be close to each other, spherical hard particles 102 of the same size are arranged so as to be arranged in the shape of a hexagonal lattice of at least two layers. Therefore, it is easy to arrange the hard particles 102 in a plurality of layers at the highest density. Therefore, the pad 100a which generates a large frictional force can be easily manufactured.

Additionally, according to the present embodiment, in the process of arranging the plurality of hard particles 102 in the mold 302 so as to be close to each other, the liquefied resin 103 and the hard particles 102 are put into the mold 302 while being mixed together, and then, the resin 103 is pressurized to discharge a portion of the resin 103 from the inside of the mold 302. Therefore, it becomes easy to arrange the hard particles 102 by a lubrication action by the liquefied resin 103 so as to be close to each other.

Additionally, according to the present embodiment, the resin 103 for increasing the lubricity between the hard particles 102 is also used to connect the hard particles 102 together. Therefore, the process is simplified, and manufacture of the pad 100a becomes easier.

Particularly, in the present embodiment, the spherical hard particles 102 of the same size are arranged on the friction surface 101 of the pad 100a so as to be close to each other, and a portion of each of the hard particles 102 is exposed from the friction surface 101. Therefore, by combining the pad with the disc 200a having the same irregularities, a braking device which has little wear and has a braking force can be formed.

For example, a braking device having a high frictional force can be obtained by setting the spring coefficient or damping coefficient that resiliently support the hard particles 102; the diameter or intervals of the hard particles 102; and the shape of the friction surface 201, or the like; such that irregularities of the hard particles 102 on the pad 100a side and irregularities of the friction surface 201 on the disc 200a side follow each other when the disc 200a is rotated. Otherwise, a braking device which prevents vibration of the hard particles 102 and stably generates a braking force can be obtained by setting the spring coefficient or damping coefficient that resiliently support the hard particles 102; the diameter or intervals of the hard particles 102; and the shape of the friction surface 201, or the like; such that only the vicinities of the apex portions of the hard particles 102 on the pad 100a side and only the vicinities of protruding portions of the friction surface 201 on the disc 200a side abut on each other when the disc 200a is rotated.

Hereinafter, a second embodiment of the invention will be described. As shown in a plan view of FIG. 4A, in the present embodiment, a mixture of a lubricating liquid 309 and hard particles 200a is made to flow into an introduction port 306 of a casting mold 305 with the shape of the disc 200a or the shape of a drum of an automobile at high pressure. A discharge port 307 of the casting mold 305 is provided with a net portion 308 through which the hard particles 102 cannot pass. Therefore, only extra lubricating liquid 309 is discharged from the discharge port 307. As the lubricating liquid 309, water or a liquid with low viscosity which is apt to vaporize can be applied. The base area and the volume of the casting mold 305 are set according to the number and amount of the hard particles 102 such that the hard particles 102 are stacked in two or more layers within the casting mold 305.

Figure 4:
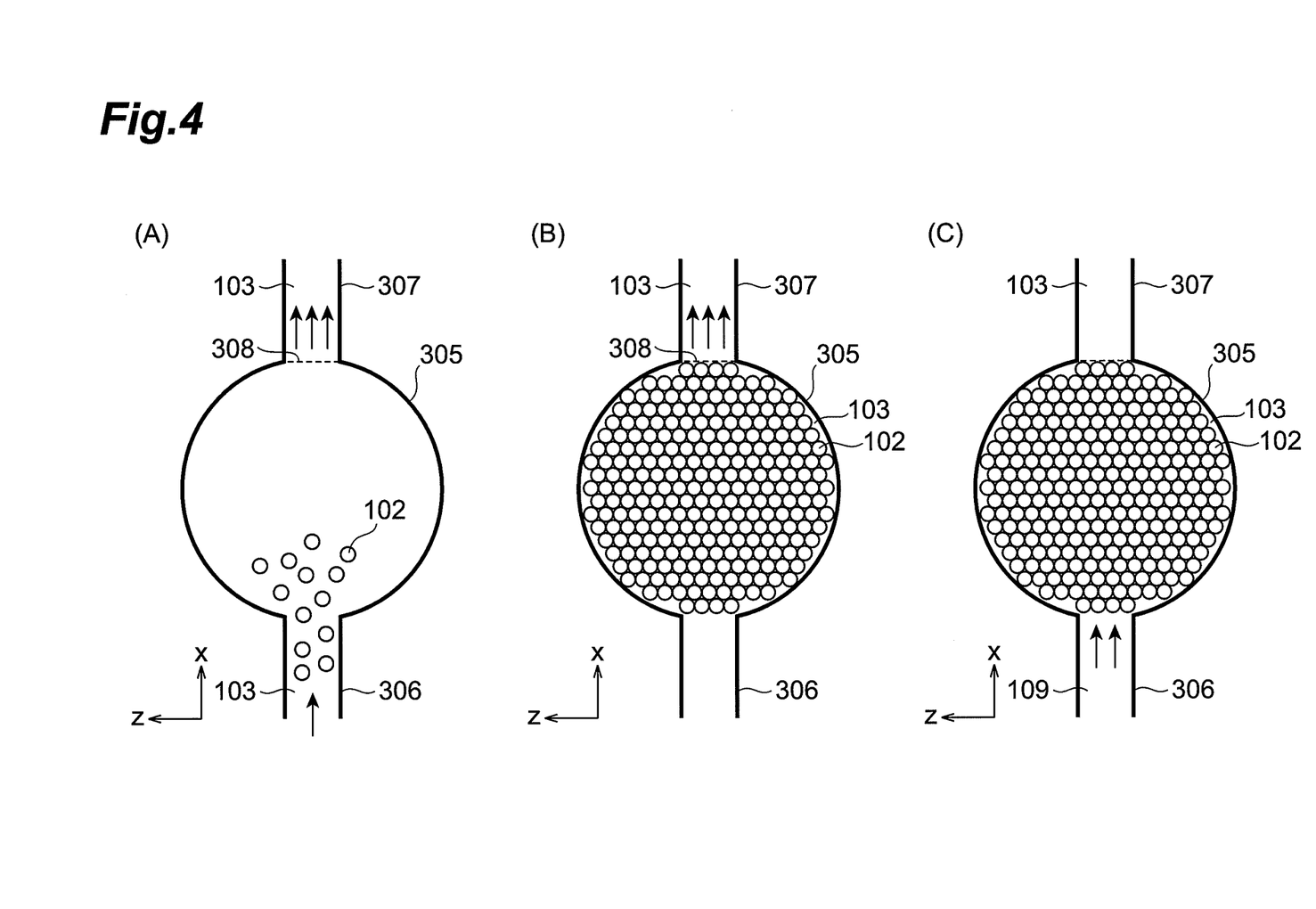
FIGS. 4A to 4C are views showing a manufacturing process of a pad related to a second embodiment.

As shown in FIG. 4B, when a sufficient number of hard particles are arranged in the casting mold 305, the casting mold 305 is heated at high temperature and the lubricating liquid 309 vaporizes. The vaporized lubricating liquid 309 is sufficiently blasted and discharged, and is dried. The hard particles 102, which are closely arranged in the shape of a hexagonal lattice, remain within the casting mold 305.

As shown in FIG. 4C, molten iron 109 is made to flow into the casting mold 305 from the introduction port 306 thereof, and is cured within the casting mold 305. Thereby, the disc 200a or a drum is manufactured.

In the present embodiment, a plurality of hard particles 102 is arranged in the casting mold 305 which suppresses movement of the hard particles 102 so as to be close to each other, and the hard particles 102 arranged in the casting mold 305 are fixed by the molten iron 109 to form the friction surface 201. Therefore, the disc 200a or a drum in which a plurality of hard particles 102 is arranged on the friction surface 201 can be more easily manufactured.

Additionally, according to the present embodiment, in the process of arranging the plurality of hard particles 102 within the casting mold 305 so as to be close to each other, spherical hard particles 102 of the same size are arranged so as to be arranged in the shape of a hexagonal lattice of at least two layers. Therefore, it is easy to arrange the hard particles 102 in a plurality of layers at the highest density. Therefore, the disc 200a or a drum which generates a large frictional force can be easily manufactured.

Figure 5:
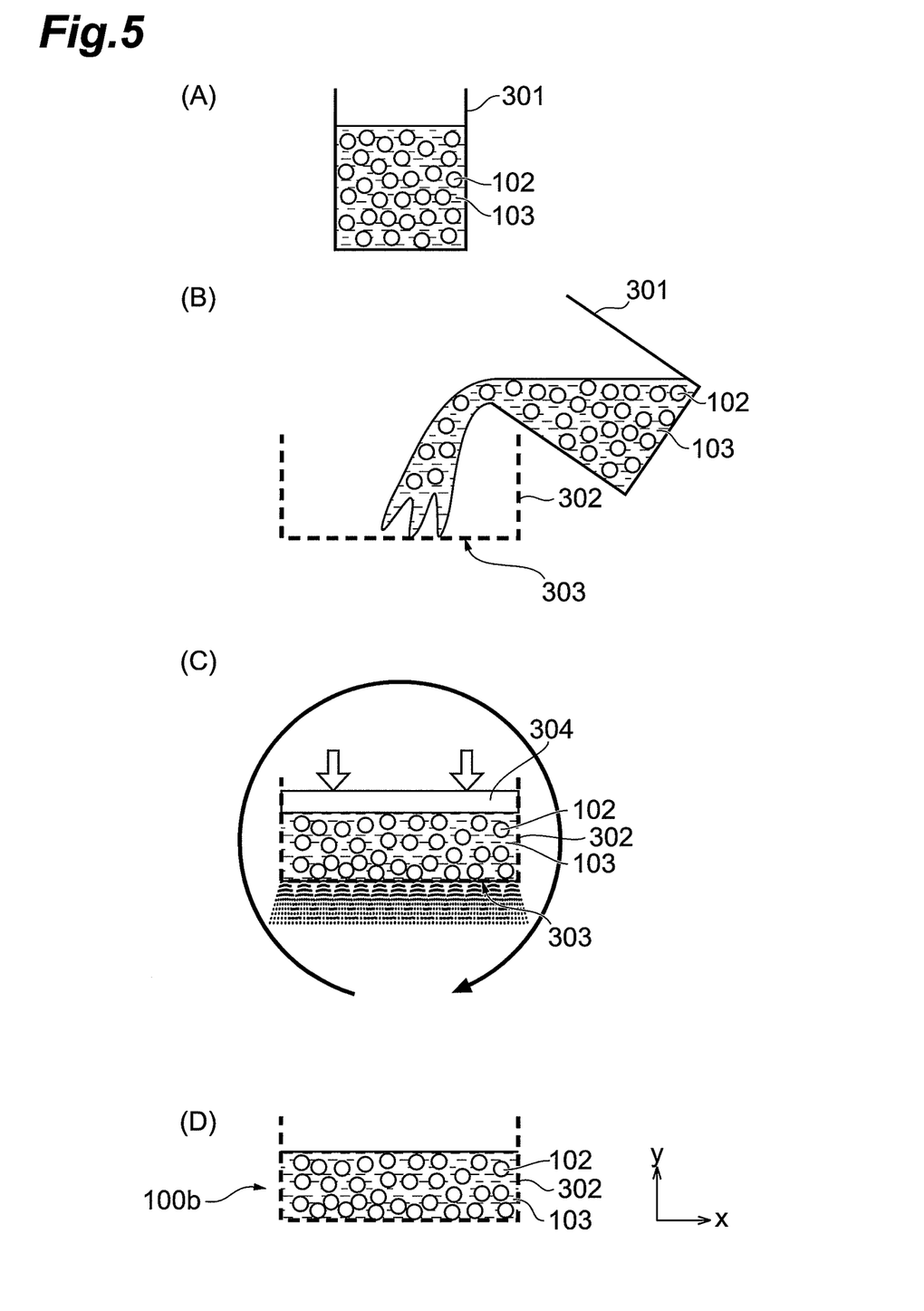
FIGS. 5A to 5D are views showing a manufacturing process of a pad related to a third embodiment.

Hereinafter, a third embodiment of the invention will be described. In the present embodiment, a pad in which hard particles are irregularly arranged at a desired mean density on a friction surface is manufactured. As shown in FIGS. 5A and 5B, the same process as FIGS. 3A and 3B in the above first embodiment is implemented.

As shown in FIG. 5C, a mold 302 is rotated at low speed, and the inside of the mold 302 is brought into an agitated state. At a pressure determined such that the hard particles 102 have a desired density in the resin 103, a pressure is applied to a mixture of the hard particles 102 and the resin 103 by the pressurizing cylinder 304. As a result, extra resin 103 is discharged from the hole portion 303. In addition, in the process of dispersing and arranging a plurality of hard particles 102 in the mold 302 while reducing the travel distance caused by the influence of gravity, the influence of gravity may be reduced by other methods of rotating the mold 302.

As shown in FIG. 5D, while the rotational frequency of the mold 302 is gradually reduced and the agitated stated is released, the resin 103 is cooled and cured. Finally, the resin 103 is subjected to heat treatment or the like and is completely cured.

In the present embodiment, the plurality of hard particles 102 is dispersed and arranged in the mold 302 while reducing the travel distance caused by the influence of gravity, and the hard particles 102 arranged in the mold 302 are fixed with the resin 103 to form the friction surface 101. Therefore, the pad 100b having the friction surface 101 in which the hard particles 102 are irregularly dispersed and arranged at a desired density can be more easily manufactured.

Additionally, in the present embodiment, in the process of dispersing and arranging the plurality of hard particles 102 in the mold 302 while reducing the travel distance caused by the influence of gravity, the hard particles 102 are dispersed and arranged in the mold 302 by rotating the mold 302 in which the hard particles 102 are put. Therefore, it is possible to easily implement reduction of the travel distance caused by the influence of gravity and dispersing the hard particles 102.

Figure 6:
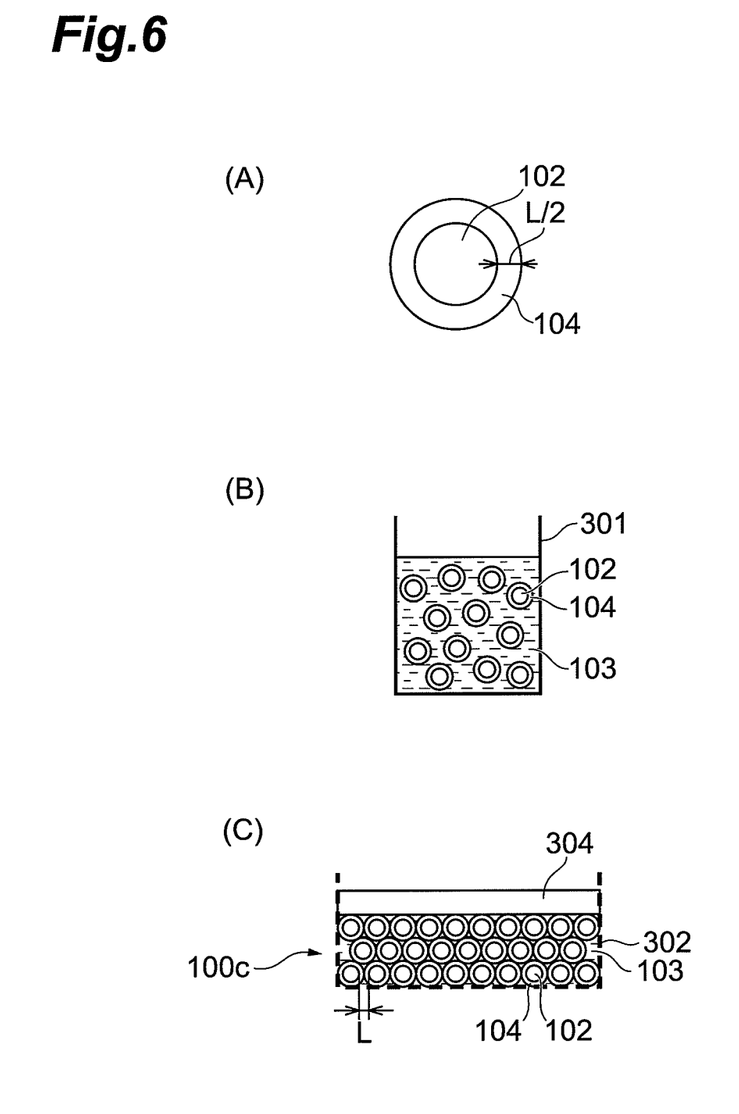
FIGS. 6A to 6C are views showing a manufacturing process of a pad related to a fourth embodiment.

Hereinafter, a fourth embodiment of the invention will be described. In the present embodiment, a pad in which hard particles are arranged in the shape of a hexagonal lattice at regular intervals is manufactured. As shown in FIG. 6A, the hard particles 102 are covered with a resin layer 104 with a thickness of L/2 with respect to desired intervals L at which the hard particles 102 are arranged.

As shown in FIG. 6B, the resin 103 liquefied at high temperature, and the hard particles 102 are mixed together in the container 301 after the resin layer 104 is cured. In addition, the temperature T of the resin 103 at this time is set to be "Melting point B of resin 103<T<Melting point A of Resin layer 104". Hereinafter, the process shown in FIGS. 3C to 3E in the above first embodiment is similarly performed, and a pad 100c in which the hard particles 102 are arranged in the shape of a hexagonal lattice at desired regular intervals as shown in FIG. 6C is manufactured.

According to the present embodiment, in the process of arranging the plurality of hard particles 102 in the mold 302 so as to be close to each other, the spherical hard particles 102 of the same size, which have the resin layer 104 with a predetermined thickness of L/2 on the surfaces thereof, are arranged so as to be close to each other. Therefore, it becomes easy to arrange the hard particles 102 at regular intervals of twice the thickness of the resin layer 104. Therefore, a pad 100c having the friction surface 101 in which the hard particles 102 are arranged at predetermined intervals can be more easily manufactured.

Figure 7:
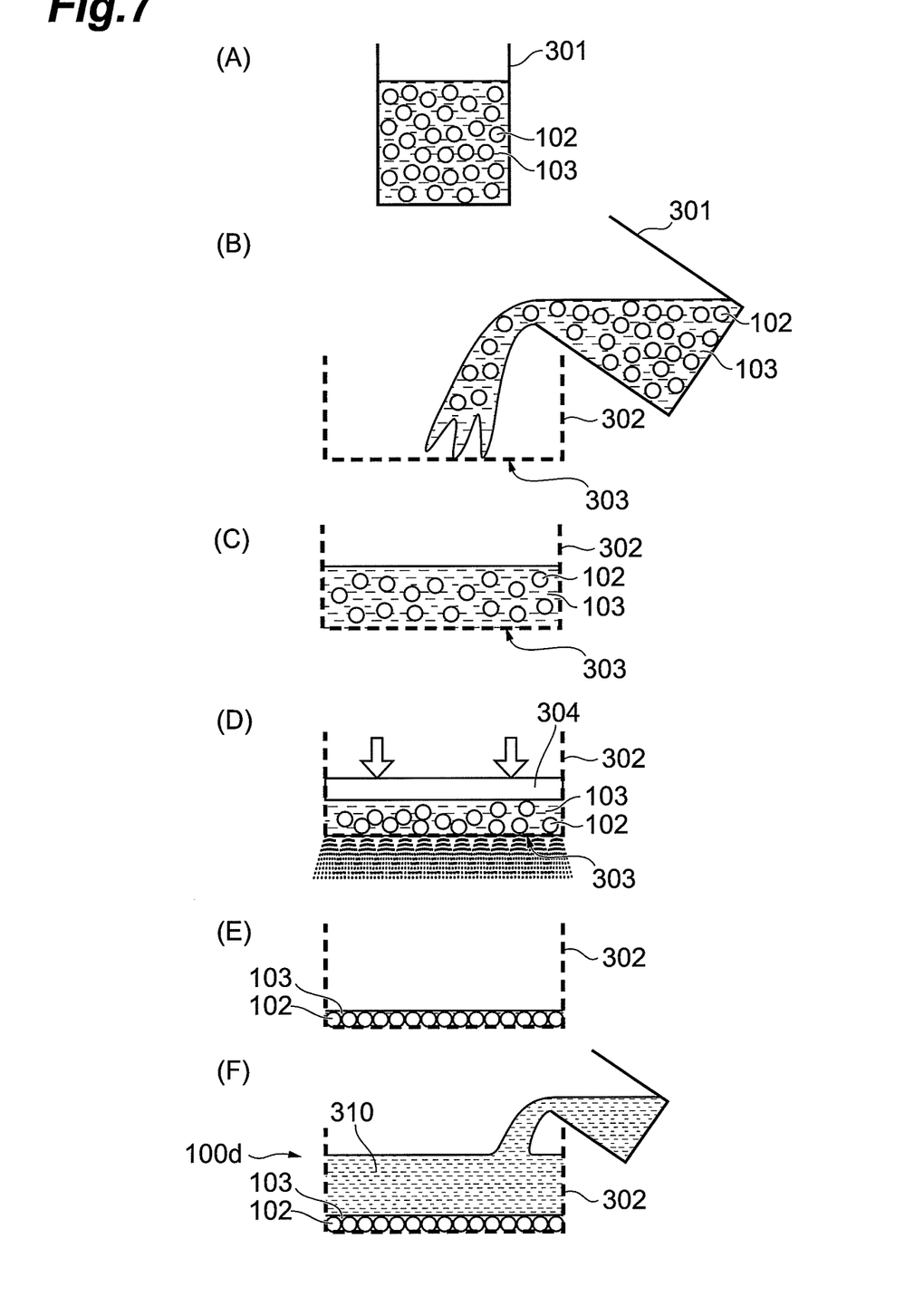
FIGS. 7A to 7F are views showing a manufacturing process of a pad related to a fifth embodiment.

Hereinafter, a fifth embodiment of the invention will be described. As for the pad 100a or the like in which the hard particles 102 are arranged in the friction surface 101, the hard particles 102 may be arranged minimally only in one layer on the friction surface 101. Therefore, in the present embodiment, a pad in which hard particles are arranged only in one layer on a friction surface is manufactured.

As shown in FIG. 7A, the resin 103 liquefied at high temperature, and the hard particles 102 are mixed together in the container 301. As shown in FIGS. 7B and 7C, the mixture of the hard particles 102 and the resin 103 is made to flow into a mold 302 which has a hole portion 303 provided with a plurality of holes whose diameter is smaller than the diameter of the hard particles 102. The amount of a mixture of the hard particles 102 and resin 103 which are made to flow into the mold 302 is set to an amount by which only one layer of hard particles 102 are closely arranged at the bottom face of the mold 302 according to the base area of the mold 302.

As shown in FIG. 7D, while resin 103 is controlled to a temperature with a certain degree of viscosity, high pressure is applied to the mixture of the hard particles 102 and the resin 103 by a pressurizing cylinder 304. As a result, extra resin 103 is discharged from the hole portion 303. As shown in FIG. 7E, finally, the hard particles 102 are aligned in one layer in the shape of a hexagonal lattice in which the density of the hard particles becomes the maximum, and the resin 103 remains between the hard particles 102. After the resin 103 is cooled, the resin 103 is preformed.

As shown in FIG. 7F, a base material 310 made of resin or metal liquefied at high temperature is poured into the mold 302. The base material 310 is completely cured by thermoforming or the like. Otherwise, the process of FIG. 7F may be a process in which the base material 310 is made of solid resin or metal, and hard particles 102 which are arranged in one layer in the shape of a hexagonal lattice with the resin 103 are bonded on the base material 310.

In the present embodiment, a pad 100d in which the hard particles 102 are arranged only in one layer in the shape of a hexagonal lattice on the friction surface 101 can be more easily manufactured.

Although the embodiments of the invention have been described above, the invention is not limited to the above embodiments, and various modifications thereof can be made.

INDUSTRIAL APPLICABILITY

The invention can provide a method for manufacturing a friction material which allows easier manufacture of a friction material in which hard members are arranged on a friction surface. Additionally, the invention can provide a friction material and a braking device in which hard members are arranged on a friction surface and which can be more easily manufactured.

REFERENCE SIGNS LIST 100a to 100d: PAD
101: FRICTION SURFACE
102: HARD PARTICLE
103: RESIN
104: RESIN LAYER
109: MOLTEN IRON
200a TO 200b: DISC
201: FRICTION SURFACE
202: PROTRUDING PORTION
301: CONTAINER
302: MOLD
303: HOLE PORTION
304: PRESSURIZING CYLINDER
305: CASTING MOLD
306: INTRODUCTION PORT
307: DISCHARGE PORT
308: NET PORTION
309: LUBRICATING LIQUID
301: BASE MATERIAL

The invention claimed is:

1. A method for manufacturing a friction material having a plurality of hard members arranged on a friction surface thereof, comprising:
   arranging the plurality of hard members within a frame which suppresses movement of the hard members so as to come into contact with each other; and
   forming the friction surface by fixing the hard members arranged within the frame with a connection material.

2. The method for manufacturing a friction material according to claim 1,
   wherein the plurality of hard members includes spherical hard members of the same size and in the arranging of the plurality of hard members within the frame so as to come into contact with each other the spherical hard members of the same size are arranged so as to be arranged in the shape of a hexagonal lattice of at least two layers.

3. The method for manufacturing a friction material according to claim 1,
   wherein, the plurality of hard members includes spherical hard members of the same size and in the arranging of the plurality of hard members within the frame so as to come into contact with each other the spherical hard members of the same size have a predetermined thickness of thin films provided on the surfaces thereof and are arranged so as to come into contact with each other.

4. The method for manufacturing a friction material according to claim 1,
   wherein, in the arranging of the plurality of hard members within the frame so as to come into contact with each other, a fluid and the hard members are put into the frame while being mixed together, and then, the fluid is pressurized to discharge at least a portion of the fluid from the inside of the frame, thereby arranging the plurality of hard members within the frame so as to come into contact with each other.

5. The method for manufacturing a friction material according to claim 4,
   wherein the fluid is the connection material.

6. A method for manufacturing a friction material having a plurality of hard members arranged on a friction surface thereof, comprising:
   dispersing and arranging the plurality of hard members within a frame while reducing the travel distance caused by the influence of gravity; and
   forming the friction surface by fixing the hard members arranged within the frame with a connection material.

7. The method for manufacturing a friction material according to claim 6,
   wherein, in the dispersing and arranging of the plurality of hard members within the frame while reducing the travel distance caused by the influence of gravity, the hard members are dispersed and arranged within the frame by rotating the frame into which the hard members are put.

* * * * *